United States Patent
v. Locquengh et al.

(10) Patent No.: US 6,413,292 B1
(45) Date of Patent: Jul. 2, 2002

(54) USE OF AN AQUEOUS DISPERSION FROM A BIODEGRADABLE POLYESTER AS A SHEATHING MATERIAL FOR GRANULATED FERTILIZER

(75) Inventors: Klaus Horchler v. Locquengh, Limburgerhof; Motonori Yamamoto, Mannheim; Klaus Erhardt, Leimen; Son Nguyen Kim, Hemsbach; Volker Warzelhan, Weisenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/269,335

(22) PCT Filed: Sep. 29, 1997

(86) PCT No.: PCT/EP97/05352

§ 371 (c)(1),
(2), (4) Date: Mar. 25, 1999

(87) PCT Pub. No.: WO98/14413

PCT Pub. Date: Apr. 9, 1998

(30) Foreign Application Priority Data

Sep. 30, 1996 (DE) .......................................... 196 40 269

(51) Int. Cl.[7] .......................... A01N 25/00; B05D 7/00; B01J 13/22

(52) U.S. Cl. ................. 71/64.07; 71/64.11; 71/64.06; 427/212; 427/213; 427/213.3; 427/213.31

(58) Field of Search .......................... 71/64.02, 64.06, 71/64.07, 64.11; 427/180, 185, 212, 213, 213.3, 213.31, 215, 220, 221

(56) References Cited

U.S. PATENT DOCUMENTS 5,211,985 A * 5/1993 Shirley, Jr. et al. .......... 427/213
5,645,624 A 7/1997 Naka et al. ..................... 71/64

FOREIGN PATENT DOCUMENTS

| DE | 19521502 | 12/1996 | |
| JP | 0597561 | 4/1993 | |
| JP | 07033577 | 7/1993 | |
| JP | 07309689 | 5/1994 | |
| JP | 07315976 | 5/1994 | |
| JP | 08002989 | 6/1994 | |
| JP | 08026875 | 7/1994 | |
| WO | 96/21689 | * 7/1996 | ........... C08G/69/44 |
| WO | 96/25448 | * 8/1996 | ........... C08G/63/60 |

OTHER PUBLICATIONS

Ullmann's Enc. of Ind. Chem., 5th Ed., vol. A10, 1987, pp. 363–369.

Shaviv et al., *Fertilizer Research*, vol. 35, 1993, pp. 1–12.

* cited by examiner

Primary Examiner—Steven P. Griffin
Assistant Examiner—Eileen E. Nave
(74) Attorney, Agent, or Firm—Keil & Weinkauf

(57) ABSTRACT

A polyester dispersion comprising water and a biodegradable copolyester which contains structural units derived from both aliphatic and aromatic carboxylic acids or their derivatives, and the coated fertilizer granules prepared using this polyester dispersion, and a process for their preparation. A fertilization method in which the coated fertilizer granules according to the invention are used.

20 Claims, 3 Drawing Sheets

USE OF AN AQUEOUS DISPERSION FROM A BIODEGRADABLE POLYESTER AS A SHEATHING MATERIAL FOR GRANULATED FERTILIZER

The present invention relates to the use of a polyester dispersion comprising water and a biodegradable copolyester which contains structural units derived from both aliphatic and aromatic carboxylic acids or their derivatives, and to the coated fertilizer granules prepared using this polyester dispersion, and to a process for their preparation. The present invention furthermore relates to a fertilization method in which the coated fertilizer granules according to the invention are used.

It is generally known to employ, as fertilizers, fertilizer granules which are coated with a polymer layer. The coating increases the efficacy of these fertilizers because the coated fertilizer releases the substances which act as plant nutrients in a delayed manner and it can thus display its action over a prolonged period. Such slow-release fertilizers are described, for example, in Ullmann's Encyclopedia of Industrial Chemistry, 5th Edition 1987, Vol. A10, pp. 363–369, and the advantages are compiled in Fert. Res. 1993, Vol. 35, pp. 1–12.

A large number of fertilizer granules coated with biodegradable polymers have been described in the past.

Thus, WO 95/03260 relates to a fertilizer provided with a coating composed of two layers. This coated fertilizer, which can be used both in arable farming and in hydroponics, comprises an inner layer which is biodegradable and constructed of an aliphatic polyester and/or polyurethane and an outer layer which is insoluble in water and comprises polymers which are slowly biodegradable, for example biodegradable cellulose derivatives, low-coating, are especially high.

In general, it should be possible for the polymers used as coatings to be applied to the fertilizer starting granules without resorting to the use of organic solvents. The amount of polymer required for coating the granules in order to achieve a sufficiently pronounced slow-release effect should furthermore be as small as possible.

In addition, the coated fertilizer granules should have no tendency to stick, in particular at temperatures as they are normally found during storage or transport, without special precautions being necessary. However, this means that the coated fertilizer granules must also show virtually no tackiness at temperatures which are considerably above room temperature (25° C.).

On the other hand, the polymers used for the coating must not show undue hardness and brittleness, since the coating would otherwise be damaged, or could even chip off, when the coated fertilizer granules are exposed to mechanical stress as is the case, for example, during repackaging or, in particular, during mechanical spreading.

The above-described fertilizer granules of the prior art have as yet not been able to meet all these requirements. Problems occur in particular in relation to tackiness (in particular in the case of polyurethanes) and insufficient mechanical properties (in particular in the case of aliphatic polyesters).

The copolyesters used in accordance with the invention furthermore have good film-forming properties, which means that only small amounts of the copolyester are required for producing a stable layer, which is advantageous from an economical point of view.

Organic solvents for dispersing the copolyesters can largely or totally be dispensed with, so that it is possible (largely) to avoid the problems associated with the use of organic solvents, such as toxicity, disposal and explosion hazard, when preparing the dispersions according to the invention.

It is accordingly an object of the present invention to provide coated fertilizer granules which meet the above profile of requirements.

We have found that this object is achieved by the use of a polyester dispersion for coating fertilizer granules, which polyester dispersion comprises (A) 20 to 90% by weight of water and (B) 10 to 80% by weight of a biodegradable copolyester
  (B) with structural units derived from both aliphatic and aromatic carboxylic acids or their derivatives, obtainable by reacting a mixture which comprises:
  (a1) a mixture comprising
    (a11) 10 to 95 mol % of an aliphatic dicarboxylic acid or of a cycloaliphatic dicarboxylic acid or of an ester-forming derivative thereof or of a mixture of two or more thereof,
    (a12) 5 to 90 mol % of an aromatic dicarboxylic acid or of an ester-forming derivative thereof or of a mixture of two or more thereof,
    (a13) 0 to 10 mol % of a sulfonate-containing compound or of a mixture of two or more thereof, the total of the individual mol percentages being 100,
  (a2) a dihydroxy compound or an amino alcohol or a mixture of two or more thereof,
    the molar ratio of (a1) to (a2) being selected within a range of from 0.4:1 to 2.5:1,
  (a3) 0 to 10% by weight, based on the mixture (a1), of a chain extender or of a mixture of two or more thereof, and
  (a4) 0 to 20% by weight, based on the mixture (a1), of a compound having at least three groups capable of ester formation or of a mixture of two or more thereof,
    the recurring units derived from the (cyclo)aliphatic and aromatic carboxylic acid being randomly or alternately distributed, the copolyester having a viscosity number in the range of from 5 to 450 ml/g (measured in o-dichloro-benzene/phenol (weight ratio 50/50) at a concentration of 0.5% by weight of copolyester at 25° C.) and the amount of components (a13) and (a4) not simultaneously being in each case zero.

The biodegradable copolyesters which comprise recurring units, which are derived from both aromatic carboxylic acids or their derivatives and from aliphatic carboxylic acids or their derivatives and which are employed in the aqueous polyester dispersion used in accordance with the invention, are known per se and have been described in U.S. Pat. No. 5,446,079 and in the parallel international application WO 92/09654, in the DE-A-44 32 161 and in a series of applications of the Applicant Company itself (P 44 40 858.7, P 44 40 850.1, P 44 40 837.4, P 44 40 836.6, 195 00 757.0, 195 00 756.5, 195 00 755.7, 195 00 754.9, 195 05 185.8, 195 05 186.6).

Nevertheless, the aqueous dispersions of a biodegradable copolyester preferably used for the purposes of the present invention will be described hereinbelow.

The term "biodegradable" as used for the purposes of the present invention refers to the fact that the copolyesters, exposed to environmental factors, disintegrate after use according to the invention within an appropriate and measurable period. As a rule, degradation is hydrolytic and/or oxidative, but mostly due to the action of microorganisms such as bacteria, yeasts, fungi and algae. However, degradation may also be enzymatic, for example as described by Y. Tokiwa and T. Suzuki in "Nature", Vol. 270, pp. 76–78, 1977. For the purposes of the present invention it is possible, by selecting a suitable ratio between recurring units derived from aliphatic carboxylic acids and those derived from aromatic carboxylic acids, to vary the biodegradation rate, ie. the point in time by which the polyesters used in accordance with the invention are essentially fully degraded. A rule of thumb says that the higher the proportion of recurring units derived from aliphatic carboxylic acids, the higher the biodegradation rate of the copolyesters. Furthermore, the higher the proportion of sections with alternating sequence of recurring units derived from aliphatic and aromatic carboxylic acids or their derivatives, the higher the biodegradation rate of the copolyester.

Nutrient release can furthermore also be controlled by the number of layers and their thickness.

The polyester dispersion used in accordance with the invention comprises approximately 10 to approximately 90, preferably approximately 10 to approximately 65 and more preferably approximately 15 to approximately 40% by weight of solids, ie. of the copolyester used in accordance with the invention.

In general, aliphatic dicarboxylic acids which can be used for the purposes of the present invention have 2 to 10 carbon atoms, preferably 4 to 6 carbon atoms. The cycloaliphatic dicarboxylic acids which can be used for the purposes of the present invention are those having 7 to 10 carbon atoms, in particular those having 8 carbon atoms. In principle, however, it is also possible to employ dicarboxylic acids with a larger number of carbon atoms, ie. having up to 30 carbon atoms.

Examples which may be mentioned are: malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid and 2,5-norbornanedicarboxylic acid, with adipic acid being preferred.

Ester-forming derivatives of the abovementioned dicarboxylic acids which may be mentioned are, in particular, the di-$C_1$–$C_6$-alkyl esters, for example dimethyl, diethyl, dipropyl, dibutyl, dipentyl and dihexyl esters.

The dicarboxylic acids or ester-forming derivatives thereof can be employed singly or as a mixture of two or more thereof.

It is preferred to employ adipic acid or ester-forming derivatives thereof and sebacic acid or ester-forming derivatives thereof, in particular adipic acid or ester-forming derivatives thereof.

In general, the (cyclo)aliphatic dicarboxylic acid or ester-forming derivatives thereof amounts to approximately 10 to 95, preferably approximately 20 to approximately 50 and in particular approximately 25 to approximately 35 mol %, in each case based on the total amount of components (a11) to (a13).

Aromatic dicarboxylic acid [sic] which may be mentioned are generally those having 8 to 12 carbon atoms, preferably those having 8 carbon atoms. Examples which may be mentioned are terephthalic acid, isophthalic acid, 2,6-naphthoic acid and 1,5-naphthoic acid, and ester-forming derivatives thereof. Particular mention may be made of the di-$C_1$–$C_6$-alkyl esters, for example dimethyl, diethyl, dipropyl, dibutyl, dipentyl or dihexyl ester.

In principle, however, it is also possible to employ aromatic dicarboxylic acids which have a higher number of carbon atoms.

The aromatic dicarboxylic acids or their ester-forming derivatives (a12) can be employed singly or as a mixture of two or more thereof.

In general, the aromatic dicarboxylic acids or ester-forming derivatives thereof amount to approximately 5 to approximately 90, preferably approximately 50 to approximately 80 and in particular approximately 65 to approximately 75 mol %, in each case based on the total amount of components (a11) to (a13).

The sulfonate-containing compound (a13) employed for the purposes of the present invention is generally an alkali metal salt or alkaline earth metal salt of a sulfonate-containing dicarboxylic acid or of its ester-forming derivatives, preferably alkali metal salts of 5-sulfoisophthalic acid or mixtures of these, in particular the sodium salt. The sulfonate-containing compound (a13) amounts to 0 to approximately 10, preferably 0 to approximately 5 and in particular approximately 3 to approximately 5 mol %, in each case based on the total content of components (a11) to (a13).

The sulfonate-containing compounds can be employed singly or as a mixture of two or more thereof.

The component (a2) is according to the invention a dihydroxy compound or an amino alcohol or a mixture of two or more thereof. In principle, all diols or amino alcohols known for the preparation of esters can be employed.

In general, however, (a21) alkanediols having 2 to 12 carbon atoms, preferably 4 to 6 carbon atoms, or cycloalkanediols having 5 to 10 carbon atoms, (a22) polyether diols, ie. ether-containing dihydroxy compounds, and (a23) amino alcohols having 2 to 12 carbon atoms, preferably 2 to 4 carbon atoms, and amino cycloalcohols having 5 to 10 carbon atoms are employed.

Examples which may be mentioned are ethylene glycol, 1,2-, 1,3-propanediol, 1,2-, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, in particular ethylene glycol, 1,3-propanediol, 1,4-butanediol and 2,2-dimethyl-1,3-propanediol (neopentyl glycol); cyclopentanediol, 1,4-cyclohexanediol, 1,2-, 1,3- and 1,4-cyclohexanedimethanol and 2,2,4,4-tetramethyl-1,3-cyclobutanediol;

Diethylene glycol, triethylene glycol, polyethylene glycol, polypropylene glycol and polytetrahydrofuran, in particular diethylene glycol, triethylene glycol and polyethylene glycol, or mixtures of these, or compounds which have a varying number of ether units, for example polyethylene glycol which contains propylene units and which can be obtained, for example by polymerization by methods known per se, of firstly ethylene oxide and subsequently propylene oxide. The molecular weight (Mn) of the polyethylene glycols which can be employed is, as a rule, approximately 250 to approximately 8,000, preferably approximately 600 to approximately 3,000 g/mol;

4-Aminomethylcyclohexanemethanol, 2-aminoethanol, 3-aminopropanol, 4-aminobutanol, 5-aminopentanol, 6-aminohexanol; aminocyclopentanol and aminocyclohexanol; and mixtures thereof.

The dihydroxy compounds or amino alcohols can be employed singly or as a mixture of two or more thereof.

The molar ratio of (a1) to (a2) is generally selected in a range of from approximately 0.4:1 to approximately 2.5:1, preferably in a range of approximately 0.5:1 to approximately 1.5:1, more preferably at approximately 0.5:1 to approximately 1.2:1, in particular in a range of from approximately 0.5:1 to approximately 1:1.

The molar ratios of (a1) to (a2) in the isolated copolyester are (if appropriate after the desired amount of excess component (a2) has been removed) are approximately 0.4:1 to approximately 1.5:1, preferably approximately 0.5:1 to approximately 1.2:1, in particular approximately 0.5:1 to approximately 1:1.

Chain extenders (a3) which can generally be employed are all chain extenders which are customary for the preparation of polyesters. If these are used, they amount to approximately 0.01 to approximately 10, preferably approximately 0.05 to approximately 5, more preferably approximately 0.07 to approximately 3, and in particular approximately 0.1 to approximately 1% by weight, in each case based on the mixture (a1).

The following may be mentioned among the chain extenders employed: diisocyanates, eg. tolylene 2,4-diisocyanate, tolylene 2,6-diisocyanate, 4,4'- and 2,4'-diphenylmethane diisocyanate, naphthylene 1,5-diisocyanate, xylylene diisocyanate, hexamethylene diisocyanate, isophorone diisocyanate and methylenebis(4-isocyanatocyclohexane), in particular hexamethylene diisocyanate; trifunctional isocyanate compounds which may contain isocyanurate and/or biuret groups of a functionality of not less than 3; divinyl ethers, eg. 1,4-butanediol divinyl ether, 1,6-hexanediol divinyl ether and 1,4-cyclohexanedimethanol divinyl ether; and 2,21-bisoxazolines of the formula (I)

(I)

The latter are generally obtainable by the process described in Angew. Chem. int. Edit., Vol. 11 (1972), p. 287–288. Especially preferred bisoxazolines to be mentioned are those where $R^1$ is a single bond, a $(CH_2)_q$ alkylene group where q=2, 3 or 4, such as methylene, ethane-1,2-diyl, propane-1,3-diyl, propane-1,2-diyl, butane-1,4-diyl or a phenylene group. Particularly preferred are 2,2'-bis(2-oxazoline), bis(2-oxazolinyl)-methane, 1,2-bis(2-oxazolinyl) ethane, 1,3-bis(2-oxazolin-yl)propane, 1,4-bis(2-oxazolinyl)butane, 1,4-bis(2-oxazolinyl)benzene, 1,2-bis(2-oxazolinyl)benzene and 1,3-bis (2 -oxazolinyl) benzene.

The chain extenders (a3) may also be employed as a mixture of two or more thereof.

Furthermore, it is possible to employ a compound having at least three groups capable of ester formation (a4) or a mixture of two or more thereof, viz., if present, in an amount of from approximately 0.01 to approximately 20, preferably from approximately 1 to approximately 10, especially preferably from approximately 3 to approximately 7, and in particular from approximately 3 to approximately 5% by weight, in each case based on the mixture (a1).

The compounds employed as compounds (a4) preferably comprise 3 to 10 functional groups which are capable of ester bond formation. Especially preferred compounds (a4) have 3 to 6 functional groups of this type in the molecule, in particular 3 to 6 hydroxyl groups and/or carboxyl groups. Tri- and/or tetrafunctional carboxylic acids or derivatives thereof are particularly preferably employed. Examples which may be mentioned are: tartaric acid, citric acid, malic acid, trimethylolpropane, trimethylolethane, pentaerythritol, polyether triols, glycerol, trimesic acid, trimellitic acid, trimellitic anhydride, pyromellitic acid, pyromellitic dianhydride and hydroxyisophthalic acid.

By adding the chain extenders (a3) and/or the compounds (a4) it is possible to alter, for example, the fusion viscosity, the limiting viscosity number or the molecular weight in the desired manner, ie. accordingly increase the limiting viscosity number and the molecular weight in comparison with polyesters to which none of the chain extenders (a3) and/or compounds (a4) have been added and thus to vary the mechanical properties of the polyesters to suit the specific use.

It must be ensured that at least one of the components (a13) and/or (a4) must be present according to the invention so that the copolyester has available free acid groups.

In a further embodiment, the present invention relates to the use, for coating fertilizer granules, of a polyester dispersion comprising
(a) 20 to 90% by weight of water and
(B) 10 to 80% by weight of a biodegradable copolyester
  (B1) with structural units derived from both aliphatic and aromatic carboxylic acids or their derivatives, obtainable by reacting a mixture which comprises:
    (a1) a mixture comprising
      (a11) 10 to 95 mol % of an aliphatic dicarboxylic acid or of a cycloaliphatic dicarboxylic acid or of an ester-forming derivative thereof or of a mixture of two or more thereof,
      (a12) 5 to 90 mol % of an aromatic dicarboxylic acid or of an ester-forming derivative thereof or of a mixture of two or more thereof,
      (a13) 0 to 10 mol % of a sulfonate-containing compound or of a mixture of two or more thereof, the total of the individual mol percentages being 100,
    (a2) a dihydroxy compound or an amino alcohol or a mixture of two or more thereof,
      the molar ratio of (a1) to (a2) being selected within a range of from 0.4:1 to 2.5:1,
    (a3) 0 to 10% by weight, based on the mixture (a1), of a chain extender or of a mixture of two or more thereof, and
    (a4) 0 to 20% by weight, based on the mixture (a1), of a compound having at least three groups capable of ester formation or of a mixture of two or more thereof,
  (b1) 0.01 to less than 50% by weight, based on the mixture (a1), of a hydroxycarboxylic acid (b1) which is defined by the following formula IIa or IIb (IIa)

(IIb)

where p is an integer from 1 to 1,500 and r is 1, 2, 3 or 4, and G is a phenylene, $—(CH_2)_n-$ group, n being an integer of 1, 2, 3, 4 or 5, a —C(R)H group or a —C(R)HCH$_2$ group, R being methyl or ethyl,
or a mixture of two or more thereof,
the recurring units derived from the (cyclo)aliphatic and aromatic carboxylic acid being randomly distributed, the copolyester having a viscosity number in the range of from 5 to 450 ml/g (measured in o-dichlorobenzene/phenol (weight ratio 50/50) at a concentration of 0.5% by weight of copolyester at 25° C.) and the amount of components (a13) and (a4) not simultaneously being in each case zero.

In the above formula, p is preferably 1 to approximately 1000; r is preferably 1 or 2; n is preferably 1 or 5.

The hydroxycarboxylic acid content (b1) in the mixture reacted preferably amounts to approximately 0.1 to 30% by weight, based on the mixture (a1).

Substances which are preferably employed as hydroxycarboxylic acid (b1) are glycolic acid, D-, L-, D,L-lactic acid, 6-hydroxyhexanoic acid, its cyclic derivatives, such as glycolide (1,4-dioxane-2,5-dione), D-, L-dilactide (3,6-dimethyl-1,4-dioxane-2,5-dione), p-hydroxybenzoic acid and its oligomers and polymers, such as 3-polyhydroxybutyric acid, polyhydroxyvaleric acid, polylactide (for example, as available under the name EcoPLA® (Cargill)), and a mixture of 3-polyhydroxybutyric acid and polyhydroxyvaleric acid (the latter is available from Zeneca under the name Biopol®), the above-defined low-molecular-weight and cyclic derivatives being employed.

Naturally, mixtures of two or more of the above-defined hydroxycarboxylic acids may also be employed.

In a further embodiment, the use of the cyclic derivatives of the above-described hydroxycarboxylic acids (b1) in the reaction with the biodegradable copolyester used according to the invention gives in a manner known per se by a "ring-opening polymerization reaction" copolyesters of the above-defined type which contain block structures composed of the copolyester (B) used according to the invention which are linked to each other via in each case at least hydroxycarboxylic acid unit (b1) (re "ring-opening polymerization reaction" see Encyclopedia of Polymer Science and Engineering, Vol. 12, 2. Ed., John Wiley & Sons, 1988, p. 36–41).

Copolyesters which are especially preferably used within the scope of the present invention have the following composition regarding components (a11), (a12) and (a2), where it has to be taken into consideration that these copolyesters not only contain the chain extenders and/or compounds defined as components (a3) and (a4), but may also have sulfo groups. The data in brackets following the components in question correspond to the amount of these components in mol %:

terephthalic acid (75)—adipic acid (25)—neopentyl glycol (100), terephthalic acid (70)—adipic acid (30)—butanediol (100), TS (70)—adipic acid (25)—isophthalic acid (5)—neopentyl glycol (100).

The copolyesters used according to the invention are characterized by the following features:

They have a viscosity number in the range of from approximately 5 to 450 ml/g, preferably approximately 50 to approximately 350 ml/g, more preferably approximately 100 to approximately 350 ml/g and in particular approximately 200 to approximately 350 ml/g, in each case measured in the [sic] o-dichlorobenzene/phenol (weight ratio 50/50) at a concentration of 0.5% by weight of copolyester at a temperature of 25° C.

Furthermore, the copolyester used according to the invention has not only terminal hydroxyl groups, but also terminal carboxyl groups.

The hydroxyl number of the copolyesters used according to the invention is 0 to approximately 30, preferably 0 to approximately 20 and in particular 0 to approximately 10.

As regards further details on the (cyclo)aliphatic dicarboxylic acids, aromatic dicarboxylic acids, diols and/or amino alcohols which can be used within the scope of the present invention and the further components (a3), (a4) and (b1), reference is made to the patent applications of the Applicant Company mentioned at the outset when discussing the prior art, and of U.S. Pat. No. 5,446,079 and the parallel application WO92/09654, the contents as regards the copolyesters described therein and their preparation is incorporated in the present application by way of reference.

However, what follows is intended as a brief discussion of the preparation of the copolyesters used according to the invention.

This preparation of polyesters is known in principle (Sorensen and Campbell, "Preparative Methods of Polymer Chemistry", Interscience Publishers, Inc., New York, 1961, p. 111–127; Encyclopedia of Polymer Science and Engineering, Vol. 12, 2nd Ed., John Wiley & Sons, 1988, p. 1–75; Kunststoffhandbuch, Vol. 3/1, Carl Hanser Verlag, Munich, 1992, p. 15–23 (preparation of polyesters) and in the abovementioned Patent Applications).

Thus, for example, the reaction of dimethyl esters of the dicarboxylic acids (a11/a12) contained in (a1) with component (a2) ("transesterification") and, if appropriate, with components (a13) and/or (b1) may be carried out at from approximately 160 to approximately 230° C. in the melt under atmospheric pressure, preferably under an inert gas atmosphere.

When preparing the biodegradable copolyester used according to the invention, it is advantageous to use a molar excess of component (a2) based on the dicarboxylic acids employed, for example up to a maximum of approximately 2.5 times, preferably up to approximately 1.5 times, the amounts.

The preparation of the abovementioned copolyester is normally carried out with addition of suitable catalysts which are known per se, such as metal compounds based on elements such as Ti, Ge, Zn, Fe, Mn, Co, Zr, V, Ir, La, Ce, Li and Ca, preferably organometallic compounds based on these metals, such as salts of organic acids, alkoxides, acetylacetonates and the like, in particular based on Zn, Sn and Ti.

As a rule, the reaction of the components (a1), (a2) and, if appropriate, (b1) is carried out under reduced pressure or in a stream of inert gas, for example under nitrogen, with further heating to from 180 to 260° C. until the desired molecular weight has been reached, taking into consideration the desired molar ratio of the terminal carboxyl groups to the terminal hydroxyl groups. Then, (a3) and/or (a4) can be added, as a rule under atmospheric pressure at from approximately 50 to approximately 200° C., and the reaction can be continued.

To avoid undesirable degradation and/or secondary reactions, it is possible to add stabilizers at this process step, if desired, but the content of these should be selected as low as possible and generally amounts to 0.1 to 200 ppm, based on the copolyester. Examples of such stabilizers are phosphorus compounds as they are described, for example, in EP-A 13 461, U.S. Pat. No. 4,328,049 and the abovementioned patent applications of the Applicant Company.

The preparation of polyester dispersions too is known per se and described, inter alia, in U.S. Pat. No. 3,546,008, EP-A-0 332 980 and EP-A-0 498 156, whose contents regarding the preparation of polyester dispersions described therein being incorporated into the present application by way of reference.

To prepare the aqueous polyester dispersion used according to the invention, the copolyester (B) or the copolyester (B1) used according to the invention is first prepared as discussed above in detail, and the resulting copolyester is subsequently neutralized and dispersed in an aqueous medium using a suitable neutralizing agent.

To this end, a procedure is generally followed in which the copolyester, as a rule still as the hot melt of from approximately 150 to approximately 230° C. is treated with an aqueous solution or dispersion of a neutralizing agent. The viscosity of the melt is determined via the torque of the latter in solution. The amount of neutralizing agent added is chosen in such a way that the latter is capable of neutralizing the acid groups partially to fully, "partial neutralization" in the context of the present invention meaning a degree of neutralization of approximately at least 70% of the carboxyl groups in the polyester. As a rule, the water is added in such an amount that an aqueous polyester dispersion with a polyester content of from approximately 10 to approximately 90% by weight, preferably approximately 10 to approximately 65% by weight, results. While it is possible to add an excess of neutralizing agent, this has no advantages whatsoever in practice.

As already mentioned above, the mixture of water and neutralizing agent is added to the polyester melt at temperatures from approximately 150 to approximately 230° C., preferably at from approximately 150 to approximately 200° C. However, this should not be carried out at less than approximately 150° C., since otherwise there is a danger of not obtaining a finely disperse distribution of the polyester in water. The aqueous polyester dispersion may also be prepared from the melt in such a way that up to about half of the required amount of water is first added slowly, the neutralizing agent is then added, and the remaining amount of water is only added at the end. When adding water or the mixture of water and neutralizing agent to the melt, the temperature of the latter drops.

After the introduction of the neutralizing agent/water mixture has ended, the temperature of the resulting polyester dispersion is generally approximately 70 to approximately 100° C. The resulting polyester dispersion is stirred for a further 2 to 12, preferably 4 to 6, hours, if appropriate at an elevated temperature of up to 95° C., and subsequently cooled to ambient temperature.

Neutralizing agents which can be used are generally all conventional neutralizing agents. Examples which may be mentioned are ammonia, triethylamine, triethanolamine, monoethanolamine, diethanolamine, N-methyldiethanolamine, morpholine, N-methylmorpholine, 2-amino-2-methyl-1-propanol and mixtures of two or more thereof. Neutralizing agents which are preferably used are monoethanolamine, diethanolamine, N-methylmorpholine, methyldiethanolamine and ammonia. Alkali metal hydroxides such as sodium hydroxide or potassium hydroxide may also be used can be used [sic], but are less preferred.

After ending the dispersing process, it is furthermore possible to remove part of the water by distillation so as to obtain the highest possible solids content.

It is furthermore possible first to treat the melt obtained in the preparation of the copolyester with a suitable organic solvent, eg. methyl ethyl ketone or tetrahydrofuran and to dissolve the polymer therein, subsequently to treat the mixture with a neutralizing agent and with water for the purposes of neutralization and dispersion and subsequently to subject the mixture to distillation in vacuo to remove the organic solvent, which should be miscible with water or at least dispersible with water, by distillation, if appropriate together with excess water.

In general, this gives aqueous polyester dispersions with a solids content of approximately 10 to approximately 90% by weight, preferably approximately 10 to approximately 65% by weight, more preferably approximately 15 to approximately 40% by weight and in particular approximately 20 to approximately 30% by weight.

Moreover, the present invention also relates to fertilizer granules coated with a coating comprising a copolyester as defined above or a mixture of two or more thereof. In a further embodiment, the present invention relates to fertilizer granules with a multi-layer coating comprising at least one inner layer and one outer layer, whose outer layer comprises the copolyester already discussed above in detail, or a mixture of two or more thereof. Substances which can be used for the inner layer(s) can be, in principle, all those which may be used for coating fertilizers and which differ from the copolyesters used according to the invention. The at least one inner layer of the coating preferably comprises again at least one biodegradable substance which, however, differs from the copolyester in the outer layer, or the mixture of two or more thereof.

This embodiment of the present invention embraces the developments of the coating comprising two or more layers of different biodegradable copolyesters, each of which comes under the definition of the copolyesters used in accordance with the invention, or else of the coating comprising an outer layer which comprises the copolyester used according to the invention and one or more inner layers comprising a, preferably also biodegradable, substance which does not come under the definition of the copolyester.

The following may be mentioned as especially suitable biodegradable substances which do not come under the definition of the copolyester:

Aliphatic polyesters, eg. adipic acid butanediol polyester, succinic acid butanediol polyester, adipic acid neopentyl glycol polyester, adipic acid ethylene glycol polyester, biodegradable cellulose derivatives, eg. nitrocellulose, ethylcellulose and triacetylcellulose, poly(hydroxycarboxylic acids) such as homopolymers or copolymers of the hydroxycarboxylic acids described as component (b1) within the scope of the present invention, polyvinyl alcohols and the like.

Nutrient-containing substances which are suitable for coating may furthermore also be used as inner layer of the coating.

Suitable fertilizer granules which are suitable for coating are generally known granules of organic and mineral fertilizers as described, for example, in Ullmann's Encyclopedia of Industrial Chemistry, 5th Ed. 1987, Vol. A10, p. 323–431 (see, in particular, Chapters 2.1 and 4).

Suitable substances are, for example, straights and compound fertilizers, which comprise, either singly or, if appropriate, in combination, nutrients such as nitrogen, potassium or phosphorus, if appropriate in the form of their salts. Examples are NP, NK, PK and NPK fertilizers, nitrogen-containing straights such as nitrochalk, ammonium sulfate, ammonium nitrate sulfate and urea, and also slow-release fertilizers, in particular based on urea, eg. isobutylidenediurea, crotonylidenediurea and urea/formaldehyde condensate.

It is furthermore possible to employ fertilizer starting granules which, in addition to the abovementioned main components, additionally comprise salts of Mg, Fe, Mn, Cu, Zn, Mo and/or B in minor amounts, ie. normally in amounts of from approximately 0.01 to approximately 5% by weight.

The longest mean diameter of the fertilizer starting granules is generally approximately 0.5 to approximately 10, preferably approximately 0.7 to approximately 5 mm. Their bulk density is normally approximately 0.5 to approximately 1.5 kg/l.

The fertilizer granules or the coating may furthermore comprise other customary additives, eg. nitrification inhibitors, for example as described in DE-A 41 28 828, DE 195 03 827.4 and DE 196 31 764.9 and in the prior art cited therein, in particular pyrazoles, pyrazole derivatives, growth regulators and active ingredients used in crop protection, eg. herbicides, fungicides and insecticides.

The present invention furthermore also relates to a process for the preparation of the coated fertilizer granules according to the invention, in which an aqueous polyester dispersion as defined above is applied to fertilizer granules. To prepare coated fertilizer granules with a multilayer coating, at least one dispersion of at least one further substance which differs from the copolyester in the outer coating or the mixture of two or more of these is applied additionally prior to applying the aqueous polyester dispersion as defined above.

The aqueous dispersions preferably comprise approximately 10 to approximately 65, more preferably approximately 15 to approximately 40% by weight of the copolyester or of the other substance other than the copolyester.

In addition, substances which control the release of the fertilizers may be added to the solutions or dispersions. These are mainly substances such as lignin, starch and cellulose. They generally amount to approximately 0.1 to approximately 5% by weight, preferably approximately 0.1 to 3% by weight, based on the total amount of coating substance.

The solutions or dispersions of the (co)polymers which form the coating are expediently applied by spraying on at from approximately 10 to approximately 110° C., preferably approximately 30 to approximately 70° C.

To avoid incipient dissolution of the fertilizer starting granules when using an aqueous dispersion or solution and applying these, only a limited amount of solution or dispersion is applied per unit time and provision is made for the water to evaporate rapidly.

This is expediently achieved by spraying a fluidized bed which is produced by fluidizing the starting fertilizer granules with a fluidizing gas with the solutions or dispersions at approximately 10 to approximately 110° C., preferably approximately 30 to approximately 70° C. After the solutions or dispersions have been sprayed on, the fluidized bed is generally maintained long enough for the solvent or dispersing medium to have evaporated.

Accordingly, the present invention also relates to a process for the preparation of coated fertilizer granules in which a fluidized bed produced by fluidizing the starting fertilizer granules with a fluidizing gas is sprayed, at from 10 to 110° C., with an aqueous polyester dispersion as defined above, or is first sprayed with at least one dispersion being at least one, preferably at least one biodegradable which differs from substance the copolyester in the outer layer, and subsequently the resulting granules are sprayed with an aqueous polyester dispersion as defined above.

Such fluidized-bed application processes are generally known and described for the preparation of coated fertilizer granules in U.S. Pat. No. 5,211,985. These processes allow particularly uniform and thin coatings to be generated which generally have a thickness of approximately 10 to approximately 150 μm, preferably approximately 10 to approximately 100 and in particular approximately 20 to approximately 80 μm.

So as to additionally reduce the tendency of the coated fertilizer granules to stick and cake, it may be advantageous to apply pulverulent solids such as talc, $SiO_2$, $Al_2O_3$ or $TiO_2$ after the granules have been coated with the substances described herein.

The coated fertilizer granules, if appropriate together with nitrification inhibitors or growth regulators, are applied to the soil by customary methods, and here they release the nutrients over a prolonged period. The fertilizer granules are distinguished in particular by the fact that they have a relatively low tendency to stick and cake, even at elevated temperatures, and that their coating is resistant to mechanical stress as occurs typically when being transferred and transported and, in particular, when being applied by means of rapidly operating modern machinery.

The invention furthermore relates to coated fertilizer granules which are prepared by the process according to the invention and to a fertilizing method in which the coated fertilizer granules according to the invention are applied to the soil, mixed with the soil or incorporated into the soil.

Below, the present invention is to be illustrated using some examples, together with the diagrams enclosed in this application.

EXAMPLES

The aromatic and aliphatic dicarboxylic acids and the dihydroxy compounds shown in Table 1 were introduced in the amounts also shown in Table 1 together with 100 ppm of tetrabutyl orthotitanate (TBOT) (added as a 10% solution in toluene) into a four-neck flask and heated to 170 to 190° C. and reacted at this temperature for 3 to 4 hours. The temperature was subsequently raised to 240° C., and the excess neopentyl glycol was distilled off in vacuo. The OH number of the polyester was measured and brought to 24 by adding neopentyl glycol.

Preparation of the Dispersions

The copolyesters PE 1 to 3 (as shown in Examples 1 to 3) were melted in a reactor at 110° C. The amounts of pyromellitic dianhydride (PMDA) shown in Table 1 were added to the resulting polyester melt, and the mixture was stirred at 50 rpm. The temperature was slowly raised to 180° C., and hexamethylene diisocyanate (HDI) was added in 0.5 ml portions until the RDI content shown in Table 1 was reached. During this addition, the torque was measured simultaneously, and when a torque of 50% (measured with a laboratory meter RE162 or Janke & Kunkel) had been reached, 300 ml of methyl ethyl ketone were added, during which process the copolyester in question dissolved. After the polymer solution had cooled to 40° C., the acid groups of the copolyester were neutralized with a stoichiometric amount of ethanolamine. Then, 1 l of water was poured into the solution and the mixture was stirred vigorously. 200 ml of acetone were added to the dispersion formed. The acetone together with MEK was subsequently distilled off in vacuo at 60° C.

TABLE 1

| Copolyester | TA mol % | AA mol % | NPG mol % | DEG mol % | CHDM mol % | PMDA % by weight | HDI % by weight |
|---|---|---|---|---|---|---|---|
| PE1 | 75 | 25 | 100 | 20 | 10 | 4 | 1.8 |
| PE2 | 72.5 | 27.5 | 100 | 20 | 10 | 4 | 1.3 |
| Cop3 | 70 | 30 | 110 | 10 | 10 | 4 | 1.3 |

In the table,

TA=terephthalic acid

AA=adipic acid

NPG=neopentyl glycol

DEG=diethylene glycol

CHDM=cyclohexanedimethanol

In a commercially available fluidized-bed coater, the fertilizer starting granules Nitrophoska® Perfekt (15+5+20+2) were fluidized using preheated air and heated to the desired temperature. The aqueous polyester dispersions in question were sprayed on through suitable nozzles, thus coating the fertilizer starting granules with a copolyester coating. The spray rate was chosen so that incipient dissolution of the fertilizer was avoided. After the spraying-on process had ended, the resulting coated fertilizer granules were dried for some more minutes in the fluidized bed.

This gave coated fertilizer granules with good processability which were not tacky at ambient temperature.

Figure 1:
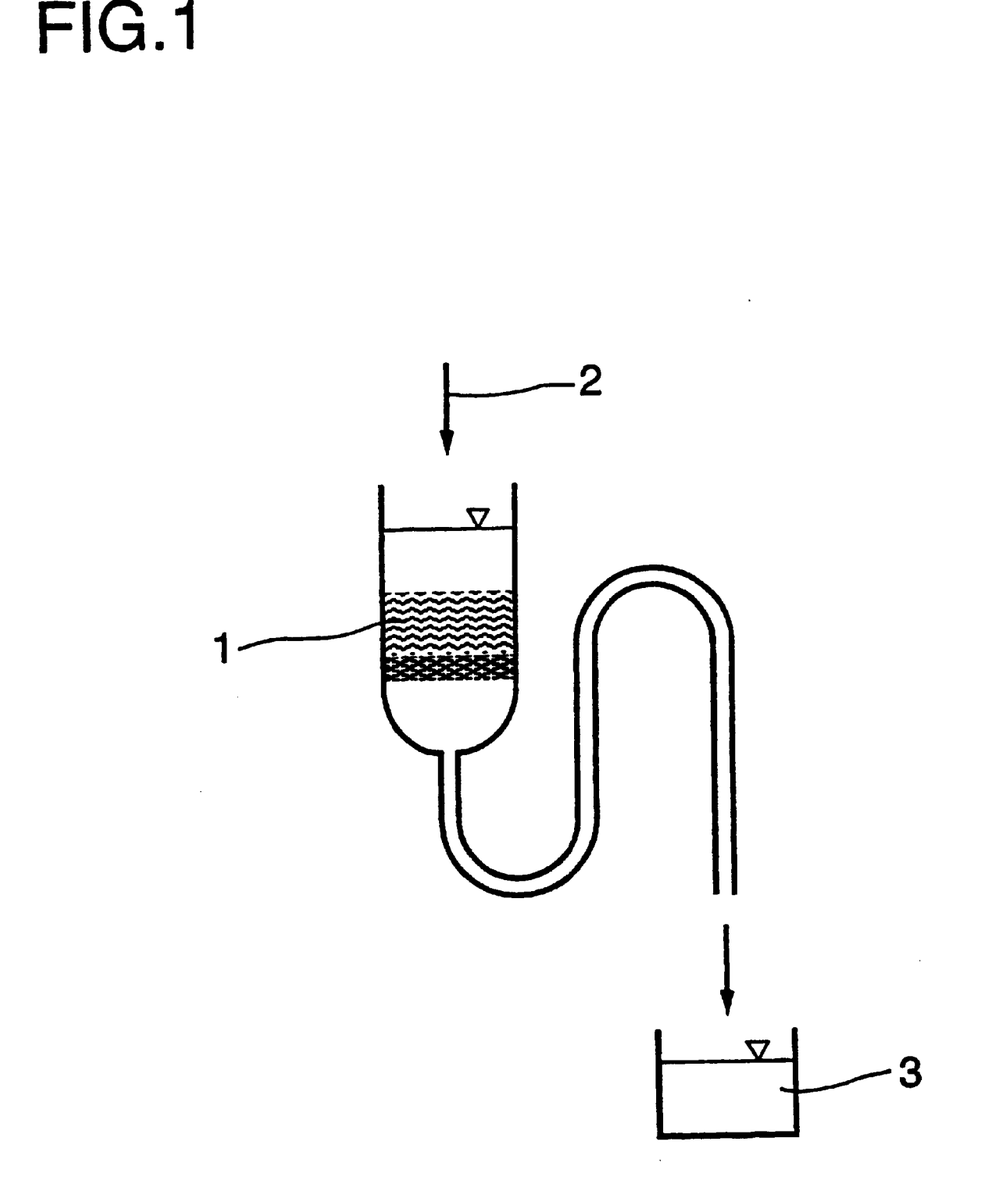
FIG. 1 shows a schematic representation of the measuring apparatus for determining the quality of the coating.

To characterize the release of nutrients, the coated fertilizer granules were subjected to a leaching test. To this end, a sample of the coated fertilizer granules (1) to be tested (10 g) were introduced into the apparatus outlined in FIG. 1 and the apparatus was subsequently flushed with one ml/min of distilled water (2) at 25° C.

Figure 2:
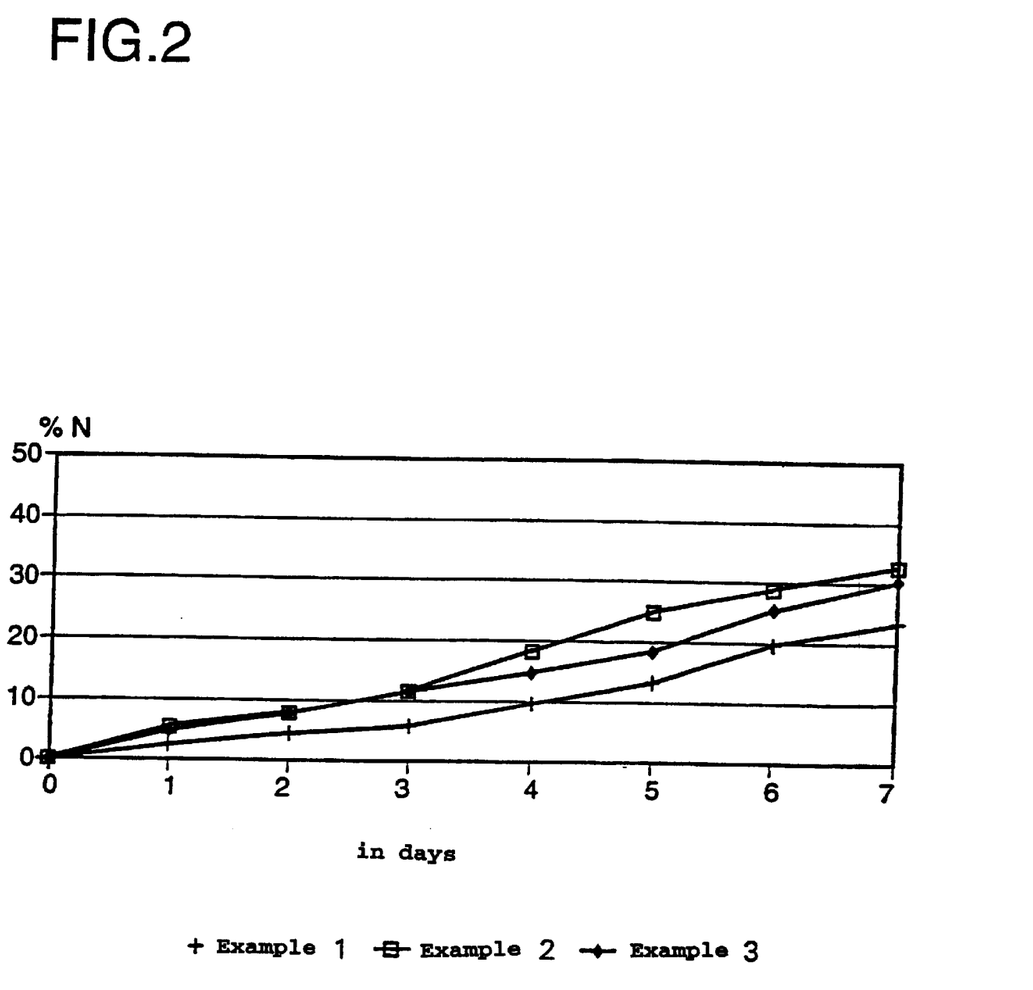
FIG. 2 shows the release of nitrogen from NPK fertilizers coated with a polyester used in accordance with the invention.

The flushing liquid collected (3) was tested daily for its nutrient content (mostly is only nitrogen), and the result was expressed as percentage relative to the amount of nutrient in the fertilizer starting granules. The results of the tests carried out over several days are compiled in the appended leaching curves as shown in FIG. 2.

Figure 3:
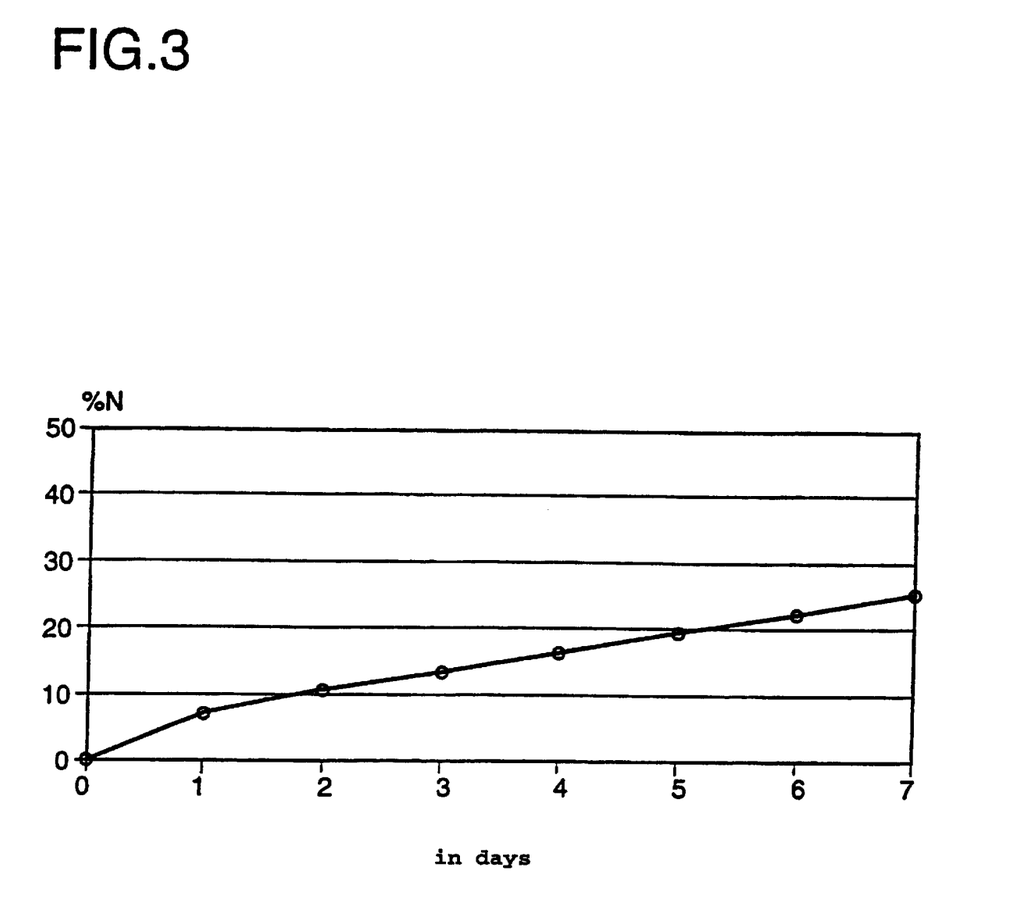
FIG. 3 shows the corresponding release of nitrogen using a coating based on Osmocote® plus 3-4 M.

FIG. 3 shows the results regarding the release of nitrogen which were achieved by using a commercially available product with a non-degradable coating based on crosslinked vegetable oils (Osmocote® Plus 3-4M, by Scotts). It will be noted that the fertilizer granules coated according to the invention are equal to the coatings which were available to date and which were satisfactory with regard to their release of nitrogen, but additionally have the advantageous characteristic of being biodegradable and thus do not cause any residues in the soil.

We claim:

1. In a process for producing polymer coated fertilizer granules, the improvement comprising applying to fertilizer granules an aqueous polyester dispersion comprising
   (A) 20 to 90% by weight of water and
   (B) 10 to 80% by weight of a biodegradable copolyester (B) with structural units derived from both aliphatic and aromatic carboxylic acids or their derivatives, obtainable by reacting a mixture which comprises:
      (a1) a mixture comprising
         (a11) 10 to 95 mol % of at least one aliphatic or cycloaliphatic dicarboxylic acid or ester-forming derivative thereof,
         (a12) 5 to 90 mol % of at least one aromatic dicarboxylic acid or ester-forming derivative thereof,
         (a13) 0 to 10 mol % of at least one sulfonate-containing compound, the total of the individual mol percentages being 100,
      (a2) at least one dihydroxy compound or amino alcohol, the molar ratio of (a1) to (a2) being selected within the range of from 0.4:1 to 2.5:1,
      (a3) 0 to 10% by weight, based on the mixture (a1), of at least one chain extender, and
      (a4) 0 to 20% by weight, based on the mixture (a1), of at least one compound having at least three groups capable of ester formation,
the structural units derived from said aliphatic and aromatic carboxylic acids being randomly distributed, the copolyester having a viscosity number in the range of from 5 to 450 ml/g (measured in o-dichlorobenzene/phenol (weight ratio 50/50) at a concentration of 0.5% by weight of copolyester at 25° C.) and the amount of components (a13) and (a4) not simultaneously being in each case zero.

2. The process of claim 1, wherein said aqueous polyester dispersion comprises
   (A) 20 to 90% by weight of water and
   (B) 10 to 80% by weight of a biodegradable copolyester (B1) with structural units derived from both aliphatic and aromatic carboxylic acids or their derivatives, obtainable by reacting a mixture which comprises:
      (a1) a mixture comprising
         (a11) 10 to 95 mol % of at least one aliphatic or cycloaliphatic dicarboxylic acid or ester-forming derivative thereof,
         (a12) 5 to 90 mol % of at least one aromatic dicarboxylic acid or ester-forming derivative thereof,
         (a13) 0 to 10 mol % of at least one sulfonate-containing compound, the total of the individual mol percentages being 100,
      (a2) at least one dihydroxy compound or amino alcohol, the molar ratio of (a1) to (a2) being selected within the range of from 0.4:1 to 2.5:1,
      (a3) 0 to 10% by weight, based on the mixture (a1), of at least one chain extender, and
      (a4) 0 to 20% by weight, based on the mixture (a1), of at least one compound having at least three groups capable of ester formation,
      (b1) 0.01 to less than 50% by weight, based on the mixture (a1), of at least one hydroxycarboxylic acid (b1) which is defined by the following formula IIa or IIb (IIa)

(IIb)

where p is an integer from 1 to 1,500 and r is 1, 2, 3 or 4, and G is a phenylene, —(CH$_2$)$_n$, group, n being an integer of 1, 2, 3, 4 or 5, a —C(R)H group or a —C(R)HCH$_2$ group, R being methyl or ethyl, the structural units derived from said aliphatic and aromatic carboxylic acids being randomly distributed, the copolyester having a viscosity number in the range of from 4 to 450 ml/g (measured in o-dichlorobenzenelphenol (weight ratio 50/50) at a concentration of 0.5% by weight of copolyester at 25° C.) and the amount of components (a13) and (a4) not simultaneously being in each case zero.

3. The process of claim 1, where prior to applying the aqueous polyester dispersion, applying to said fertilizer granules at least one dispersion comprising at least one biodegradable substance which differs from the copolyester.

4. The process of claim 2, where prior to applying the aqueous polyester dispersion, applying to said fertilizer granules at least one dispersion comprising at least one biodegradable substance which differs from the copolyester.

5. The process of claim 1, in which a fluidized bed, produced by fluidizing said fertilizer granules with a fluidizing gas, is sprayed with said aqueous polyester dispersion at from 10 to 110° C.

6. The process of claim 2, in which a fluidized bed, produced by fluidizing said fertilizer granules with a fluidizing gas, is sprayed with said aqueous polyester dispersion at from 10 to 110° C.

7. The process of claim 3, in which a fluidized bed, produced by fluidizing said fertilizer granules with a fluidized gas, is first sprayed with at least one dispersion comprising at least one biodegradable substance which differs from the copolyester, and subsequently the resulting granules are sprayed at from 10 to 110° C. with said aqueous polyester dispersion.

8. The process of claim 4, in which a fluidized bed, produced by fluidizing said fertilizer granules with a fluidized gas, is first sprayed with at least one dispersion comprising at least one biodegradable substance which differs from the copolyester, and subsequently the resulting granules are sprayed at from 10 to 110° C. with said aqueous polyester dispersion.

9. Fertilizer granules which are coated with a coating comprising one or more copolyesters as defined in claim 1.

10. Fertilizer granules which are coated with at least one copolyester as defined in claim 2.

11. Fertilizer granules with a multilayer coating comprising at least one inner layer and one outer layer, the outer layer of which comprises at least one copolyester as defined in claim 1.

12. Fertilizer granules as claimed in claim 11, where the at least one inner layer of the multilayer coating comprises at least one biodegradable substance which differs from the copolyester in the outer layer.

13. Fertilizer granules with a multilayer coating comprising at least one inner layer and one outer layer, the outer layer of which comprises at least one copolyester as defined in claim 2.

14. Fertilizer granules as claimed in claim 13, where the at least one inner layer of the multilayer coating comprises at least one biodegradable substance which differs from the copolyester in the outer layer.

15. A fertilizing method in which the coated fertilizer granules of claim 9 are applied to the soil, mixed with the soil or incorporated into the soil.

16. A fertilizing method in which the coated fertilizer granules of claim 10 are applied to the soil, mixed with the soil or incorporated into the soil.

17. A fertilizing method in which the coated fertilizer granules of claim 11 are applied to the soil, mixed with the soil or incorporated into the soil.

18. A fertilizing method in which the coated fertilizer granules of claim 12 are applied to the soil, mixed with the soil or incorporated into the soil.

19. A fertilizing method in which the coated fertilizer granules of claim 13 are applied to the soil, mixed with the soil or incorporated into the soil.

20. A fertilizing method in which the coated fertilizer granules of claim 14 are applied to the soil, mixed with the soil or incorporated into the soil.

* * * * *